US008868905B2

(12) United States Patent
Davis et al.

(10) Patent No.: US 8,868,905 B2
(45) Date of Patent: Oct. 21, 2014

(54) ADAPTIVE DOCUMENT REDACTION

(75) Inventors: Anthony T. Davis, Lancashire (GB); Richard J. Somerfield, Cheshire (GB)

(73) Assignee: Appsense Limited, Warrington (GB)

( * ) Notice: Subject to any disclaimer, the term of this patent is extended or adjusted under 35 U.S.C. 154(b) by 167 days.

(21) Appl. No.: 13/568,528

(22) Filed: Aug. 7, 2012

(65) Prior Publication Data
US 2014/0047234 A1 Feb. 13, 2014

(51) Int. Cl.
H04L 29/06 (2006.01)
G06F 21/60 (2013.01)
G06F 21/62 (2013.01)
G06F 21/10 (2013.01)

(52) U.S. Cl.
CPC ............ *H04L 63/107* (2013.01); *G06F 21/606* (2013.01); *G06F 21/10* (2013.01); *G06F 21/604* (2013.01); *G06F 21/62* (2013.01); *G06F 21/6209* (2013.01)
USPC ........................................... 713/160; 726/28

(58) Field of Classification Search
CPC ..... G06F 21/10; G06F 21/604; G06F 21/606; G06F 21/62; G06F 21/6209; H04L 63/107
USPC ........................................... 713/160; 726/28
See application file for complete search history.

(56) References Cited

U.S. PATENT DOCUMENTS

| | | | |
|---|---|---|---|
| 6,247,133 B1 * | 6/2001 | Palage et al. ..................... | 726/27 |
| 7,373,330 B1 * | 5/2008 | Klebe .............................. | 705/51 |
| 7,921,450 B1 * | 4/2011 | Vainstein et al. ................. | 726/1 |
| 8,364,712 B2 * | 1/2013 | O'Sullivan et al. ........... | 707/783 |
| 8,644,506 B2 * | 2/2014 | Zellner .......................... | 380/249 |
| 8,677,132 B1 * | 3/2014 | Liao et al. ..................... | 713/176 |
| 2002/0078361 A1 * | 6/2002 | Giroux et al. ................. | 713/183 |
| 2004/0117655 A1 * | 6/2004 | Someshwar ................... | 713/201 |
| 2007/0061889 A1 * | 3/2007 | Sainaney ....................... | 726/26 |
| 2007/0245409 A1 * | 10/2007 | Harris et al. ..................... | 726/5 |
| 2008/0168277 A1 * | 7/2008 | Forlenza et al. ............. | 713/189 |
| 2011/0040967 A1 * | 2/2011 | Waller et al. ................. | 713/161 |
| 2012/0216290 A1 * | 8/2012 | Roy et al. ....................... | 726/27 |

* cited by examiner

*Primary Examiner* — Michael S McNally
(74) *Attorney, Agent, or Firm* — Wilmer Cutler Pickering Hale and Dorr LLP

(57) ABSTRACT

Described are computer-based methods and apparatuses, including computer program products, for adaptive document redaction. A container is generated comprising a set of redacted documents corresponding to an original document, each redacted document having a level of redaction corresponding to a viewing location, and a header comprising encryption information for each redacted document in the set of redacted documents. A request to view the original document is received from a requesting device. The container is transmitted to the requesting device. A request for additional encryption information for a redacted document from the set of redacted documents is received from the requesting device, wherein the redacted document comprises a level of redaction for a viewing location that is equal to a location of the requesting device. The additional encryption information is transmitted to the requesting device.

13 Claims, 5 Drawing Sheets

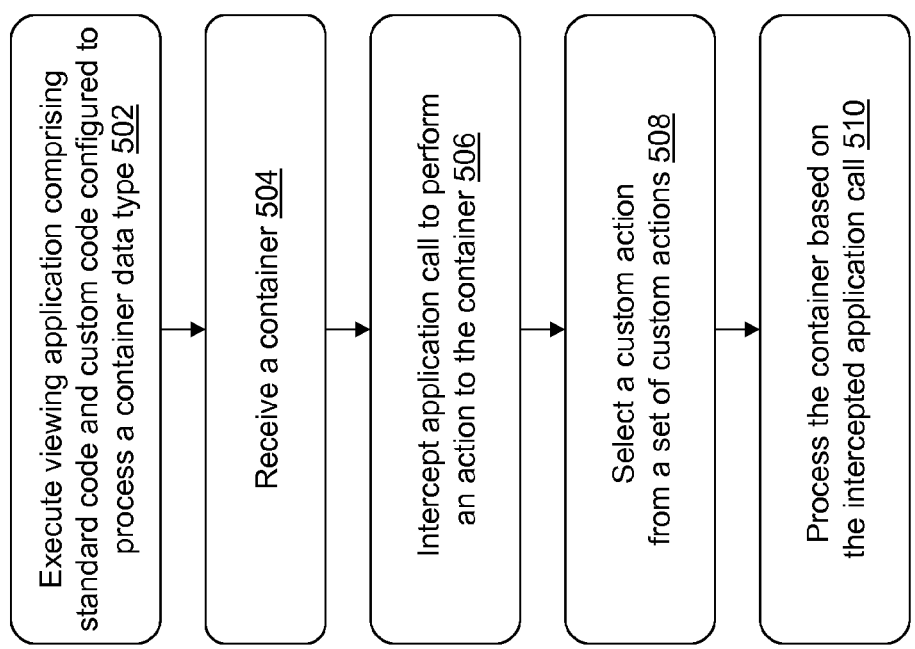

ADAPTIVE DOCUMENT REDACTION

RELATED APPLICATIONS

This application is related to U.S. application No. 13/568,520, entitled "Secure Redacted Document Access," filed on the same date as the present application, which is incorporated by reference herein in its entirety.

TECHNICAL FIELD

The technical field relates generally to computer-based techniques for adaptive document redaction.

BACKGROUND

With the proliferation of mobile devices, it is becoming increasingly necessary for mobile device users to remotely view and transport documents. Viewing and/or storing documents on mobile devices can create concerns for both privacy and security since the physical location of the mobile device is often difficult to control.

Regarding privacy, while it may be acceptable to view a document in a private office, it may not be acceptable to view the same document in a different location (e.g., in a public location such as on a train). For example, a doctor can adequately protect a patient's privacy while viewing the patient's records in an office, but should not view the same records on a train where other passengers could potentially see the records. It is often desirable for an organization, such as a hospital or doctor's office, to control how and where a document can be viewed by the organization's employees.

Regarding security, corporate files and resources are often managed using a perimeter based security model, where only authorized information is allowed to cross the perimeter (e.g., only particular documents can be accessed outside of a corporation's internal network). However, with the proliferation of devices, technologies, and services that make it easier and easier to transport data, the perimeter model is becoming increasingly more difficult to maintain.

Companies often maintain a perimeter model through physical segregation. For example, a security sensitive organization can maintain two physically separate infrastructures: an infrastructure internal only to the organization (e.g., an intranet), and an externally connected infrastructure (e.g., with limited availability to employees outside of the internal infrastructure). However, organizations are often unable to maintain both infrastructures due to, for example, a need for external access to documents (such as from both a business standpoint and for human convenience). Further, most devices used within such an organization can download internal information and easily transfer it elsewhere (e.g., USB sticks/devices, laptops, external hard drives, etc.). Such devices can render the perimeter model useless. Further, while cloud storage platforms (for example, Dropbox™) are proficient for file sharing, corporate environments have been slow to adapt such platforms due to the lack of security.

One way to manage mobile access to secure documents to provide a special viewer application in which securely redacted documents can be viewed in the same way as with commercially available applications, but the viewers have limited functionality compared to that of standard viewing applications (e.g., the special viewer has no save function to prevent the viewer from saving the document). However, each time a new format or version of the document is generated, a new viewer must also be provided along with the document, which can increase management costs and deployment time. Further, if the special viewer application is not widely supported, it can hinder the spread of technology because the document cannot be opened otherwise.

SUMMARY

The computerized methods and apparatus disclosed herein allow organizations to extend services and capabilities to users outside of the organization itself (e.g., to the user's home, while the user is on a bus, plane, etc.), while ensuring that only authorized users are able to access appropriate levels of sensitive information based on the user's location, even though the information no longer resides within the organizations perimeter.

In accordance with the disclosed subject matter, systems and methods are provided for accessing a document, and in particular for accessing a redacted document.

Disclosed subject matter includes a computerized method for accessing a document. The computerized method includes generating, by a computing device, a container including a set of redacted documents corresponding to an original document, each redacted document having a level of redaction corresponding to a viewing location, and a header comprising encryption information for each redacted document in the set of redacted documents. The computerized method includes receiving, by the computing device, a request to view the original document from a requesting device. The computerized method includes transmitting, by the computing device, the container to the requesting device. The computerized method includes receiving, by the computing device, a request for additional encryption information for a redacted document from the set of redacted documents from the requesting device, wherein the redacted document comprises a level of redaction for a viewing location that is equal to a location of the requesting device. The computerized method includes transmitting, by the computing device, the additional encryption information to the requesting device.

Disclosed subject matter includes an apparatus for accessing a document. The apparatus includes a processor. The apparatus includes a memory coupled to the processor and including computer readable instructions that, when executed by the processor, are configured to cause the processor to generate a container including a set of redacted documents corresponding to an original document, each redacted document having a level of redaction corresponding to a viewing location, and a header comprising encryption information for each redacted document in the set of redacted documents. The instructions are configured to cause the processor to receive a request to view the original document from a requesting device. The instructions are configured to cause the processor to transmit the container to the requesting device. The instructions are configured to cause the processor to receive a request for additional encryption information for a redacted document from the set of redacted documents from the requesting device, wherein the redacted document comprises a level of redaction for a viewing location that is equal to a location of the requesting device. The instructions are configured to cause the processor to transmit the additional encryption information to the requesting device.

Disclosed subject matter includes a computer program product, tangibly embodied in a non-transitory computer readable medium. The computer program product includes instructions being configured to cause a data processing apparatus to generate a container including a set of redacted documents corresponding to an original document, each redacted document having a level of redaction corresponding to a viewing location, and a header comprising encryption information for each redacted document in the set of redacted documents. The instructions are operable to receive a request to view the original document from a requesting device. The instructions are operable to transmit the container to the requesting device. The instructions are operable to receive a request for additional encryption information for a redacted document from the set of redacted documents from the requesting device, wherein the redacted document comprises a level of redaction for a viewing location that is equal to a location of the requesting device. The instructions are operable to transmit the additional encryption information to the requesting device.

Disclosed subject matter includes a computerized method for accessing a redacted document. The computerized method includes executing, by a computing device, a viewing application for viewing documents, the viewing application including standard code for the viewing application that can not process a container data type, and custom code configured to allow the viewing application to process a container data type. The computerized method includes receiving, by the computing device, a container from a remote computing device including a set of redacted documents corresponding to an original document, each redacted document having a level of redaction corresponding to a viewing location, and header comprising encryption information for each redacted document in the set of redacted documents. The computerized method includes processing, by the computing device, the container based on a location of the computing device and the custom code.

Disclosed subject matter includes an apparatus for accessing a redacted document. The apparatus includes a processor. The apparatus includes a memory coupled to the processor and including computer readable instructions that, when executed by the processor, are configured to cause the processor to execute a viewing application for viewing documents, the viewing application including standard code for the viewing application that can not process a container data type, and custom code configured to allow the viewing application to process a container data type. The instructions are configured to cause the processor to receive a container from a remote computing device including a set of redacted documents corresponding to an original document, each redacted document having a level of redaction corresponding to a viewing location, and a header comprising encryption information for each redacted document in the set of redacted documents. The instructions are configured to cause the processor to process the container based on a location of the computing device and the custom code.

Disclosed subject matter includes a computer program product, tangibly embodied in a non-transitory computer readable medium. The computer program product includes instructions being configured to cause a data processing apparatus to execute a viewing application for viewing documents, the viewing application including standard code for the viewing application that can not process a container data type, and custom code configured to allow the viewing application to process a container data type. The instructions are operable to receive a container from a remote computing device including a set of redacted documents corresponding to an original document, each redacted document having a level of redaction corresponding to a viewing location, and a header comprising encryption information for each redacted document in the set of redacted documents. The instructions are operable to process the container based on a location of the computing device and the custom code.

The techniques, which include both methods and apparatus, described herein can provide one or more of the following advantages. A secure document container can be used to control how much a document is redacted for a requesting device based on the location of the requesting device. By including different levels of redacted documents in a single container, the separately located versions of a document can be avoided by instead treating all of the documents as a single secure collection. Commercially available applications can be modified with custom code to allow secure viewing of the redacted documents in the container without needing to provide separate viewing applications. The custom code can be transparent to a user of the viewing device, which allows standard applications to process the container without affecting the user audience.

Other aspects and advantages of the present invention will become apparent from the following detailed description, taken in conjunction with the accompanying drawings, illustrating the principles of the invention by way of example only.

BRIEF DESCRIPTION OF THE DRAWINGS

FIG. 5 is an exemplary diagram of a computerized method for secure redacted document access.

DETAILED DESCRIPTION

The techniques described herein provide a container of redacted documents and techniques for accessing the same. A container can be generated from an original document. An original document can be processed to create one or more redacted versions of the original document, each having different levels of redaction for viewing at different locations. For example, a redacted document for viewing in a public location can have a large amount of data redacted so that it can be safely accessed (e.g., viewed, edited, saved, etc.) in public (e.g., to prevent the inadvertent disclosure of confidential information contained in the main document). Whereas, a redacted document for viewing in a private location can have little (or no) redaction so the full contents of the main document can be accessed. Each time a user attempts to access an original document, the redacted document that meets the level of redaction required for the requesting device's location is accessed and presented to the user. Other embodiments are within the scope of the invention.

As an example, a doctor may have a container that includes a patient's medical records on a portable computer (e.g., iPad, tablet PC, etc.), which includes an original unredacted copy of the document and a copy that is redacted such that it can be viewed in public without violating any policy or security constraints (e.g., that are imposed by the company and/or by other organizations). In the doctor's office, the doctor is allowed full access to the patient's medical records, and can therefore view the original unredacted copy of the patient's medical records. When the doctor is on the train (e.g., on the way to a meeting, on the way to visit a client), the doctor can only view the redacted copy, which includes a simple patient summary sheet with all patient-confidential information redacted from the patient's medical records (e.g., in compliance with HIPAA privacy rules).

Commercially available applications (e.g., Adobe Acrobat™ or Microsoft Word™) can be modified with custom code so that a device can securely access the container using the commercially available applications. For example, the custom code can be configured to provide secure access to redacted documents in the container based on the viewing device's location using custom actions (e.g., a user is presented with a document with the appropriate level of redaction based on the viewing device's location). The custom code can intercept application calls to the underlying operating system (e.g., open, save, close, and delete actions from the application), and redirect the calls to a secure access layer that is configured to execute custom actions that operate in conjunction with the original action or in replacement of the original action.

Figure 1:
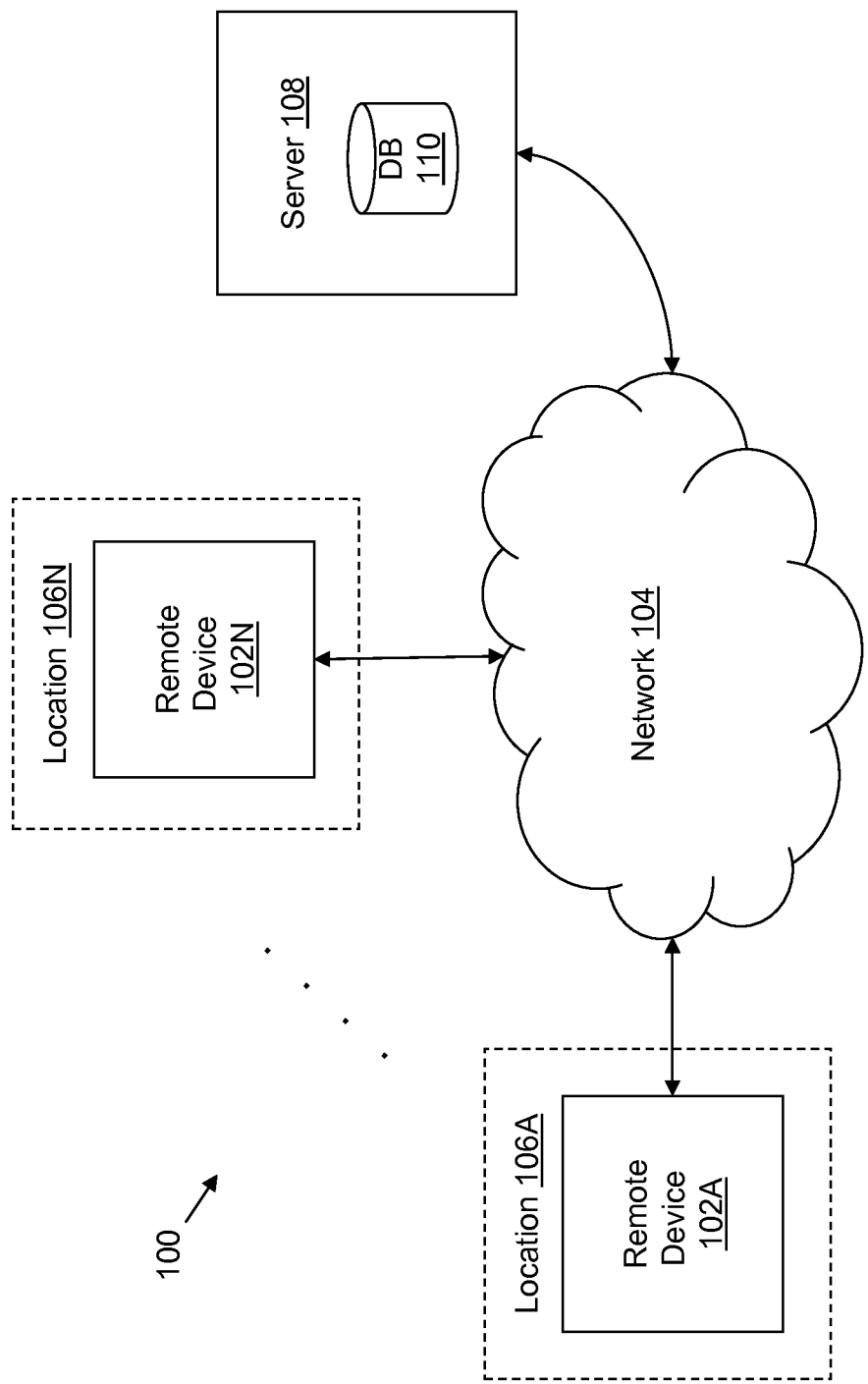
FIG. 1 is an exemplary diagram of a system for adaptive document redaction.

FIG. 1 is an exemplary diagram of a system 100 for adaptive document redaction. System 100 can include remote devices 102A through 102N connected to network 104 (collectively, remote device 102). Remote devices 102 can be, for example, a cell phone, Smartphone, personal digital assistant (PDA), laptop, personal computer, tablet, and/or any device located remotely from server 108. Remote device 102A can be at location 106A, and remote device 102B can be at location 106B (collectively, locations 106). Remote devices 102 can determine its associated location, for example, based on GPS coordinates, radio frequency identifiers (RFID), wireless router locations, or other various geographic markers or location detection techniques. Each remote device 102 can be at a different location 106. For example, the locations can include a user's car, home, backyard, friend's house, and/or any other possible location for a remote device 102, including at the organization operating database 110.

Remote devices 102 can be in communication with server 108 through network 104, which includes database 110. Server 108 can be, for example, a server or a set of servers provided by an organization that provide remote devices 102 access to documents, programs, etc. stored on database 110. For example, a company can own and manage server 108 (e.g., server 108 is a corporate file server), and remote devices 102 can be devices used by employees of the company to access documents stored in database 110.

The system 100 is an example of a computerized system that is specially configured to perform the computerized methods described herein. However, the system structure and content recited with regard to FIG. 1 are exemplary only and are not intended to limit other examples to the specific structure shown in FIG. 1. As will be apparent to one of ordinary skill in the art, many different configurations of the system 100 are suitable to implement the techniques described herein are possible.

In addition, information can flow between the elements, components and subsystems described herein using any technique. Such techniques include, for example, passing the information over a network (e.g., network 104) using standard protocols, such as TCP/IP, passing the information between modules in memory and passing the information by writing to a file, database, or some other non-volatile storage device. The network 104 can be, for example, the Internet. In addition, pointers or other references to information can be transmitted and received in place of, or in addition to, copies of the information. Conversely, the information can be exchanged in place of, or in addition to, pointers or other references to the information. Other techniques and protocols for communicating information can be used without departing from the scope of the invention.

Figure 2:
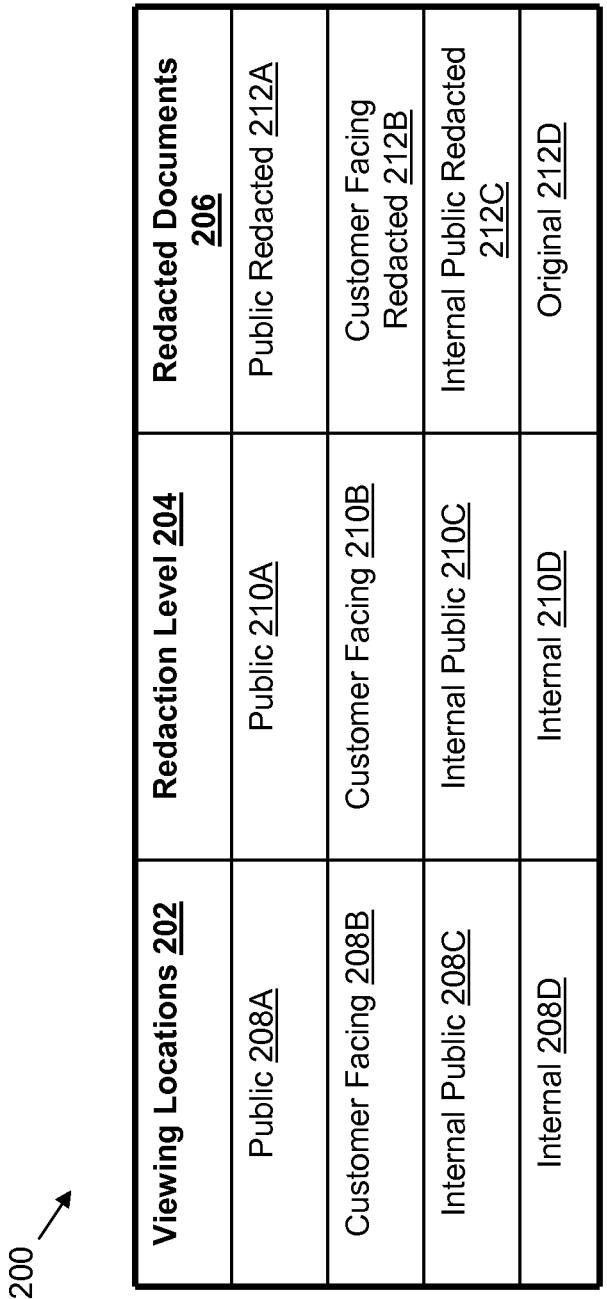
FIG. 2 is an exemplary table of viewing locations, redaction levels, and associated documents for adaptive document redaction.

FIG. 2 is an exemplary table 200 of viewing locations 202, redaction levels 204, and redacted documents 206 that can be used with adaptive document redaction. Viewing locations 202 include public viewing location 208A, customer facing location 208B, internal public location 208C, and internal location 208D. Redaction levels 204 include public redaction level 210A, customer facing redaction level 210B, internal public redaction level 210C, and internal redaction level 210D. Redacted documents 206 include public redacted document 212A, customer facing redacted document 212B, internal public redacted document 212C, and original document 212D.

Table 200 can be used to take an original document, and to generate the redacted documents 206 based on the viewing locations 202 and the associated redaction levels 204. The viewing locations 202 include different locations where a document can be viewed (e.g., which can be used to determine the proper redacted document to display at the various locations 106). For example, public location 208A can be an area open to the public, such as a train, bus, etc. Customer facing location 208B can be a location where a customer (e.g., of a company managing the document) can view the location, such as the customer's premises. Internal public location 208C can be an internal location (e.g., internal to the company managing the document), where members of the public may be present, such as a cafeteria or public conference room. Internal location 208D can be an internal location where members of the public will not be able to view the document, such as an employee's office. Each of the viewing locations 202 can have associated with it one or more of the redaction levels 204 and/or redacted documents 206.

The redaction levels 204 can define the amount of redaction for the document based on the associated viewing location 202A. For example, public redaction level 210A can correspond to public location 208A. In the example of FIG. 2, public redaction level 210A is the highest level of redaction for a document because any member of the public can view the document (e.g., and therefore any sensitive material, including customer-specific information and company confidential information, needs to be removed from the document). Customer facing redaction level 210B can be one level below the public redaction level 210A, and therefore can redact less information from the original document than the public redaction level 210A. For example, customer facing redaction level 210B may redact some company-specific information, while maintaining customer-specific information. Internal public redaction level 210C can be another level down from the customer facing redaction level 210B, and therefore redacts less information from the original document than the customer facing redaction level 210B. For example, the internal public redaction level 204 may preserve both customer-specific information and some company-specific information that would otherwise be redacted using the customer facing redaction level 210B. Internal redaction level 210D can be the lowest level of redaction, and redacts the least amount of information than the remaining redaction levels 204. For example, internal redaction level 210D may not redact any information from the original document. While four redaction levels 204 have been described, the system can be configured to use more or fewer levels of redaction, each with respective levels of redaction.

Redacted documents 206 can be generated based on the original document so that they can be viewed at the associated viewing locations 202. For example, public redacted document 212A can be viewed at public viewing location 208A (e.g., and protect the privacy and security of the document). Each redacted document 206 can be redacted as defined by the associated redaction level 204. For example, public redacted document 212A can be redacted to remove the information defined by public redaction level 210A, and so on. Original document 212D is preferably not redacted, because it is for viewing at internal location 208D, and therefore does not require any information to be removed from the document. Although, in some embodiments, the system can be configured such that the original document can include some redactions.

Figure 3:
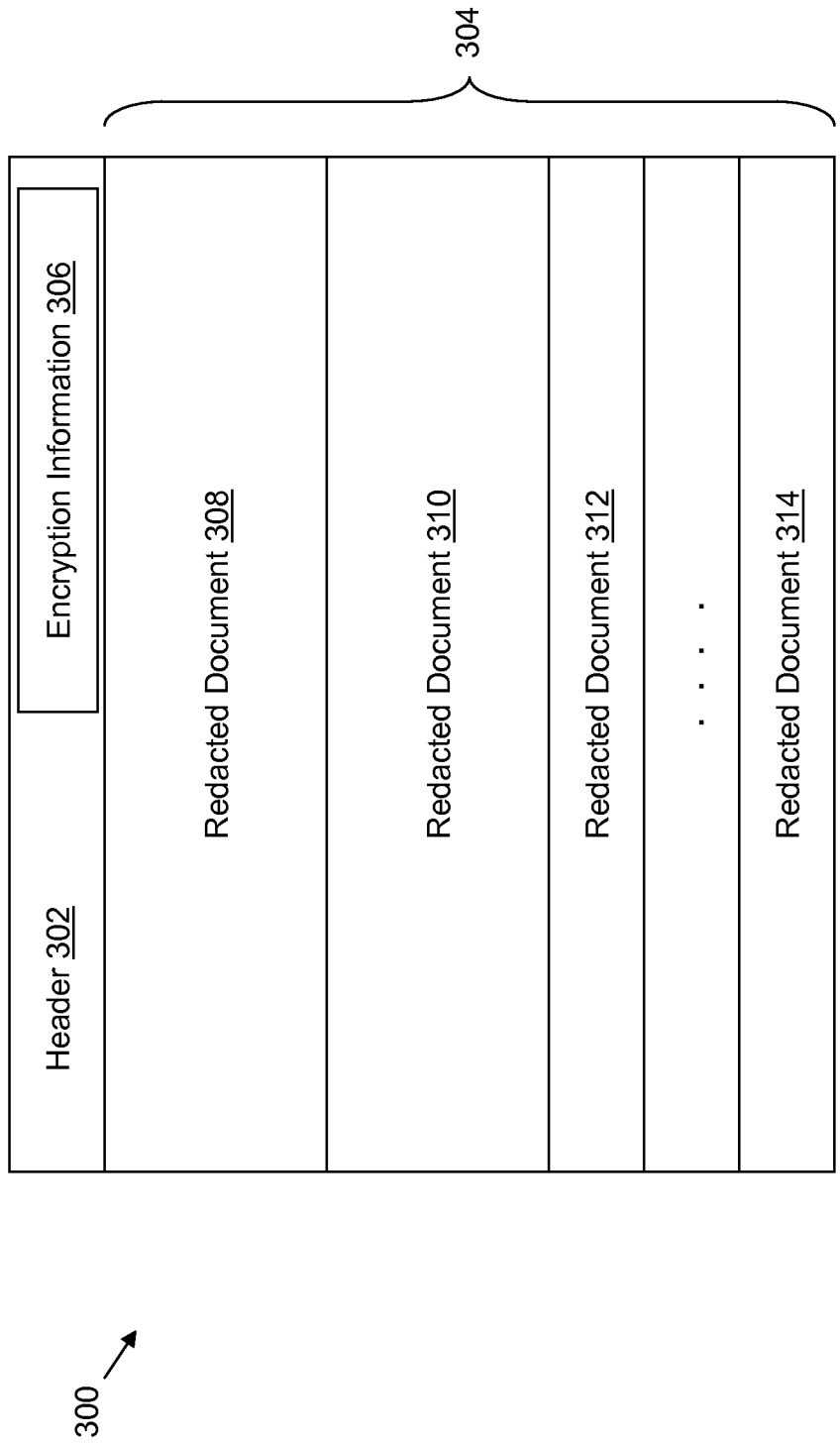
FIG. 3 is an exemplary diagram of a container data type for adaptive document redaction.

FIG. 3 is an exemplary diagram of a container 300 for adaptive document redaction. The container 300 can be provided instead of a single document itself. For example, if a user e-mails a PDF to another user, the system 100 can be configured to send the container 300 instead of the PDF document itself (which can occur transparently to the users).

The container 300 can include a header 302 and a body 304. Header 302 can include encryption information 306 for each redacted document in the body 304. For example, the set of documents in body 304 can each be encrypted using public/private key encryption, using the same or different keys. The public/private keys can be generated when the server generates the redacted documents in the body 304 (and/or the redacted documents associated with placeholder documents). The encryption information 306 can include the private key for each redacted document. The header 302 can also be encrypted (e.g., using public/private key encryption). In some embodiments, the encryption information contained therein can be complete encryption information (e.g., the full set of encryption information required to decrypt the redacted documents in the body 304, whether individually or in group(s)).

The body 304 can include redacted documents 308, 310, 312 and 314, each corresponding to an original document. Preferably, each of the redacted documents 308, 310, 312 and 314 are copies of the same original document, but having different portions of information redacted therefrom. For example, redacted documents 308 and 310 can correspond to public redacted document 212A and customer facing redacted documents 212B, respectively. Likewise, redacted documents 312 and 314 can correspond to internal public redacted document 212C and original document 212D, respectively. Thus, each redacted document in the body 304 can correspond to a document that was redacted according to a redaction level for a particular viewing location (e.g., if redacted document 308 corresponds to public redacted document 212A, then it was preferably redacted according to public redaction level 210A, and can be viewed at public viewing location 208A). The redacted documents can be a complete copy of the original document, with information redacted therefrom (e.g., blocked using black boxes). Alternatively, the redacted documents can be modified versions of the original file (e.g., a medical file where the patient's name is completely removed from the file instead of being blocked).

In some embodiments the body 304 can be configured to include both redacted documents and "placeholder" documents. For example, instead and/or in addition to the body 304 including the actual redacted documents themselves (e.g., redacted documents 308, 310, 312 and 314), the body 304 can be configured to include one or more "placeholder" documents instead. The placeholder documents can include document reference information that can be used to locate an associated redacted document from a remote location (e.g., database 110 of FIG. 1). For example, instead of including redacted document 308, the body 304 can include a placeholder for redacted document 308 that includes information sufficient to locate redacted document 308 from a remote location.

Each placeholder document can include a corresponding redaction level (e.g., redaction level 204) for the associated redacted document. For example, the redaction level can be used to determine whether a device can view the associated redacted document at a particular location before requesting the redacted document from a remote location. In some embodiments, each placeholder document can include a viewable portion. For example, a placeholder document can include a single page document that can be displayed by a viewing application. As an example, a placeholder document can include a one page text document with a standardized text message (e.g., "You are not authorized to view this document."). Placeholder documents can be used in place of redacted documents to reduce the size of the container 300 (e.g., since the placeholder documents can be configured to include minimal data, such as location information, redaction level information, a small viewable document, and/or the like).

The placeholder documents can be encrypted in the same manner as the redacted documents 308, 310, 312 and 314. The server 108 can store the encryption information (e.g., public/private keys) for the redacted documents, placeholder documents, and/or the header in a database (e.g., database 110 of server 108), although the encryption information can be stored elsewhere.

The container 300 can use a resource security model (e.g., rather than a perimeter security model) to protect its contents through encryption. As described herein, the container 300 can be encrypted, and the complete encryption information can be provided on a session-by-session basis such that if a requesting device no longer has access to the container 300, it can no longer decrypt the container 300, or any part thereof (e.g., because it is not provided with complete encryption information, such as a public key). The container 300 in FIG. 3 is intended to be illustrative only, as one of skill in the art can appreciate that various configurations and numbers of documents (or placeholder documents) can be used for the container data type without departing from the spirit of the techniques described herein.

Figure 4:
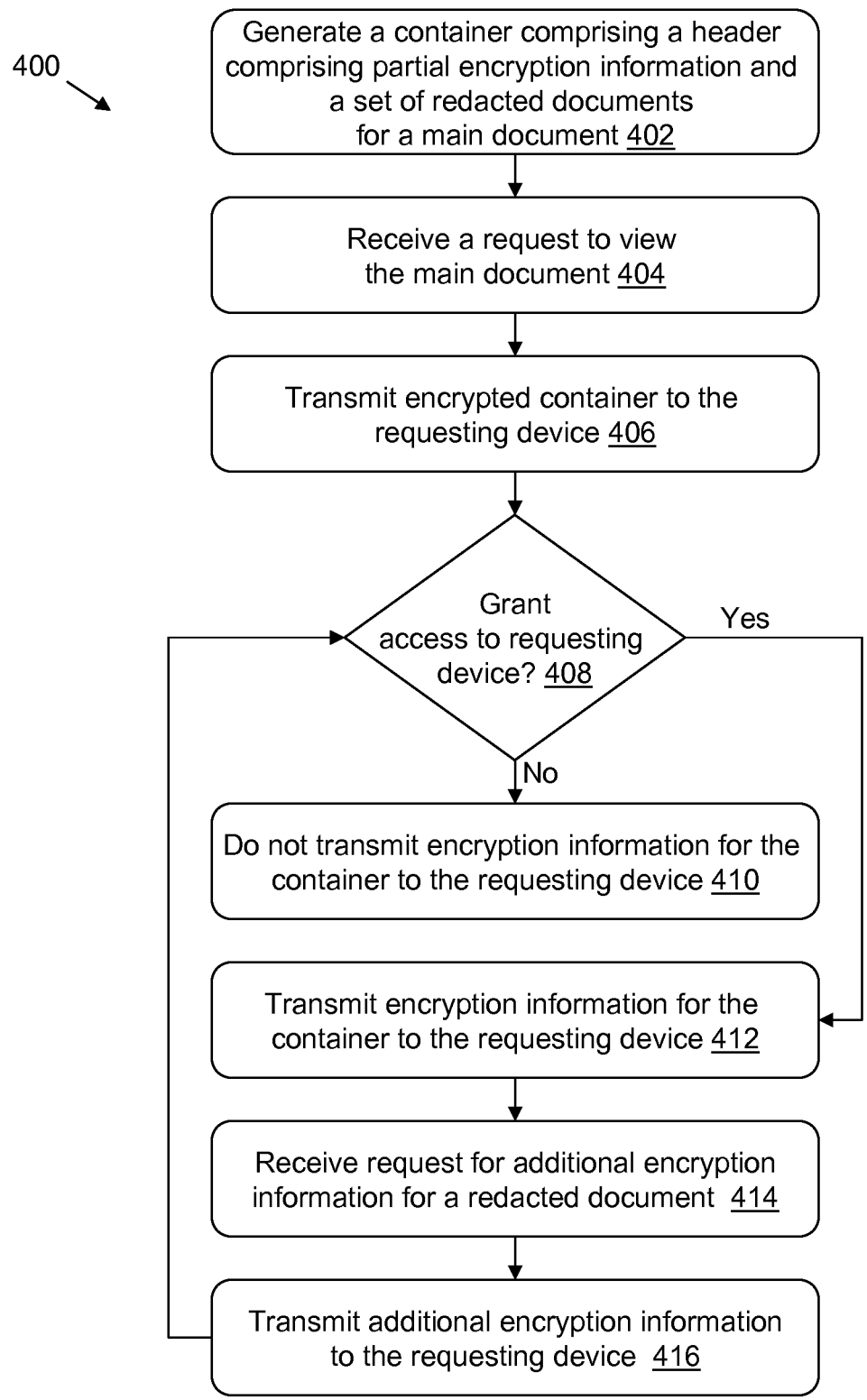
FIG. 4 is an exemplary diagram of a computerized method for adaptive document redaction.

FIG. 4 is an exemplary diagram of a computerized method 400 for adaptive document redaction. The method 400, however, is exemplary only and not limiting. The method 400 can be altered, e.g., by having stages added, altered, removed, or rearranged.

At step 402 the server 108 can generate a container 300 that includes (a) a body 304 including the set of redacted documents 308, 310, 312, 314 corresponding to an original document, and (b) a header 302 including encryption information 306 for the redacted documents in the body 304. Each redacted document can be redacted according to a respective redaction level for a particular viewing location.

The server 108 can generate the container 300 in response to different events. For example, the server 108 can generate the container 300 in response to a request to view the original document (e.g., from the remote device 102A), an attempt to e-mail a document, an attempt to copy a document, an attempt to save the document, and/or in response to other user actions that involve a document. The server 108 can also be configured to generate the container 300 when a document is created, or on demand by a user and/or administrator.

The container 300 can include placeholder document(s) for one or more redacted documents instead of the actual redacted documents. The container 300 can include a single placeholder document for the container 300 itself. For example, in some embodiments, the container 300 can include a single placeholder document that can be a single page file that includes a message (e.g., "You do not have proper permissions to view this document"). The remote device 102A can display a placeholder document instead of a redacted document (or the container itself). For example, the remote device 102A can display a placeholder document if the remote device 102A attempts to view the original document (or a redacted document), but is at a location that requires more redaction than that available from the container 300. The user's location can be determined, for example, based on GPS coordinates, radio frequency identifiers (RFID), wireless router locations, or other various geographic markers or location detection techniques. As another example, the placeholder document can be displayed if the remote device 102A is not configured to read the container 300 data type (e.g., the remote device 102A does not know how to process the container data type).

At step 404, a trigger occurs such as the server 108 receiving a request to view the original document from remote device 102A. In response to the trigger, the server 108 can encrypt one or more of the redacted documents (or placeholder document) in the body 304. For example, the server 108 can use public/private key encryption to encrypt the redacted documents. The server 108 can use a different public/private key to encrypt each document. The server 108 can add the private keys to the encryption information 306 in the header 302 (e.g., one for each document). The server 108 can also encrypt the header 302, the body 304, and/or the entire container 300. For example, the server 108 can generate a public/private key to encrypt the container 300 (or any portion thereof).

The encryption can occur at other locations and/or times as well. For example, the server 108 can encrypt the respective portions of the container 300 at the same time it is created, on demand, and/or at other predetermined times. For example, the server 108 can include a communication module (not shown) configured to encrypt the container 300 (or portions thereof) before transmitting the container 300 (e.g., to a remote device 102 and/or based on the location 106 of the remote device 102). Additionally, the encryption can be performed by other portions of the system 100 (e.g., at the remote device 102). For example, the remote device 102 can include a container module (not shown) configured to encrypt the container 300 (or portions thereof) upon receipt of the container 300 (e.g., from server 108). As another example, the container module can be configured to encrypt the container 300 based on the location of the remote device 102. For example, if the remote device 102 downloads the container 300 in a private location (e.g., within a doctor's private office), the server 108 can transmit an unencrypted container 300 to the remote device 102. If the remote device 102 changes its location 106 to a more public location (e.g., a doctor moves the remote device 102 from a private office to a public cafeteria), the container module can encrypt the container 300 to protect its contents.

At step 406, the server 108 can transmit the container 300 to the remote device 102A. The server 108 need not transmit all the redacted documents associated with an original document. For example, the container 300 can include two of the four redacted documents (e.g., 308 and 310) and placeholder documents in place of documents (e.g., in place of documents 312 and 314). For example, if the server 108 determines that redacted documents 308, 310 are viewed more often than the remaining redacted documents, the server 108 can transmit only the commonly-viewed documents 308, 310 to reduce the amount of data transmitted from the server 108 to the remote device 102A. For example, if the main document is 500 KB, then a container with four redacted documents for the main document is approximately 2 MB in size. To reduce the size of the container, only two documents of the four can be included, which reduces the size of the container to 100 MB.

At step 408, the server 108 determines whether the remote device 102A has access to the container 300 (e.g., by consulting an access list). For example, if the server 108 encrypted the container 300, the server 108 can use the encryption information to control access to the container 300. In some embodiments, the remote device 102A can be configured to not store complete encryption information (e.g., all the encryption information required to decrypt the container 300). For example, if the server 108 encrypts the container 300 using public/private key encryption, the remote device 102A can be configured to not store the public key, but to instead use it once to decrypt the container 300 and then discard the public key. Since the public key is not stored (or cached), the server 108 can authenticate the remote device 102A each time the remote device 102A requests to view the main document (or an encrypted document thereof) before providing the public key. While step 408 is described in the context of server 108 determining whether the remote device 102A has access to the container 300, other portions of the system 100 can be configured to make this determination.

The server 108 can determine whether the remote device 102A has access to the container based on stored information about the remote device 102A (e.g., a dynamic access list, a cookie, an authentication protocol, access rules, etc.). For example, a company can maintain an access list that includes a list of employees and associated device(s) for each employee. The server 108 can verify each remote device is associated with a current employee of the company based on the access list. The company can remove entries associated with terminated employees to ensure only current employees can access company documents. For example, the server 108 can determine a remote device is associated with a terminated employee and not grant access to the remote device. In some embodiments, the server 108 can include one or more access rules that control whether a remote device 102A can access a container (or associated document). For example, the access rules can be configured to allow a remote device 102A access to a container for a predetermined time period (e.g., after expiration of the time period, the remote device 102A can no longer access documents stored in the container), a predetermined number of views, for predetermined locations of the remote device (e.g., the remote device 102A can lose access if the remote device is in a forbidden location), etc.

If the remote device 102A does not have access to the container 300, the computerized method 400 proceeds to step 410, and the server 108 does not transmit decryption information for the container 202, thus preventing the remote device 102A from opening the container. If the remote device 102A has access to the container 300, the computerized method 400 proceeds to step 412, and the server 108 transmits decryption information for the container 202 to the remote device 102A. The remote device 102A can decrypt and process the container 300 using the additional decryption information (e.g., by using a complete public/private key pair).

For example, remote device 102A can be given access to encrypted container 202 for a first session (e.g., for a first view of the document, for a view at a particular location, etc.). If the remote device 102A attempts to access a document from encrypted container 300 for a second session but the server 108 determines the remote device 102A no longer has access/rights to process documents associated with the encrypted container 300 (e.g., an access period expired, they are associated with an invalid certificate, their geographic location changed, etc.), the server 108 can protect the documents in encrypted container 300 by not transmitting the encryption information to the remote device 102A. If, however, the server 108 determines that the remote device 102A has access to the encrypted container 300 for an additional session (e.g., to view the original document and/or redacted documents), the server 108 transmits the public key to the requesting device for the second session.

In some examples, the remote device 102A can continuously and/or periodically re-check that the remote device 102A can still access a document. For example, the remote device 102A can verify the remote device 102A did not move into a location where it can no longer view the open document (e.g., the remote device 102A opened a private document for viewing in a private location, but since moved to a public location with the private document still open on the device). Upon detection of such a location change, the remote device 102A can be configured to automatically close the document, and/or perform another predetermined action. The remote device 102A can perform such re-checking periodically, upon detection that the remote device 102A location changed, and/or the like. In some embodiments, the server 108 can be configured to continuously and/or periodically poll the remote device 102A to ensure the remote device 102A is in a proper location, and upon a detection that the device is not, it can send a command to close the document on the remote device 102A.

At step 414, the server 108 receives a request for additional encryption information for a redacted document from the set of redacted documents from the remote device 102A. For example, for the remote device 102A to access the redacted document, the redacted document is redacted according to a redaction level that is sufficient for the remote device 102A's location 106A. For example, the remote device 102A can execute a policy module configured to determine which, if any, of the documents in the container 300 the remote device 102A has access to based on the location of the remote device 102A. For example, the remote device 102A can execute the following algorithm:

| Algorithm 1 |
| --- |
| If $F_S > D_S$, then deny access to document,<br>Else if $F_S = D_S$, then request decryption key from server, where:<br>$F_S$ = The security factor of a document in a container, calculated based on the assigned viewing location and redaction level of the document; and<br>$D_S$ = The location factor of the device, calculated based on the current physical location of the requesting device. |

Referring to Algorithm 1, $F_S$ can be indicative of where a document can be viewed by a requesting user. Referring to FIG. 2 for example, $F_S$ can be the viewing location 202, the redaction level 204, or some combination of both fields, for the redacted document 206. The remote device 102A can determine $D_S$ based on the current physical location 106A of the remote device 102A (e.g., calculated using GPS, RFID, triangulation, etc.). For example, for public redacted document 212B, $F_S$=public viewing location 208B, and using Algorithm 1, if public viewing location 208B is greater than $D_S$ (e.g., $F_S$ requires a more secure viewing location than the location of the device $D_S$), the requesting device is denied access to the document. As another example, for public redacted document 212B, $F_S$=customer facing redaction level 210B, and using Algorithm 1, if customer facing redaction level 210B is greater than $D_S$ (e.g., $F_S$ is a redaction level for a more secure viewing location than the location of the device $D_S$), the requesting device is denied access to the document.

In some embodiments, the viewing locations 202 and/or redaction levels 204 can be assigned numerical values. For example, $F_S$ can be public viewing location 208A=1, customer facing location 208B=2, internal public location 208C=3, and internal location 208D=4, for public redacted document 212A, customer facing redacted document 212B, internal public redacted document 212C, and original document 212D, respectively. If a user is in a public location ($D_S$=1), then a user is denied access to all documents besides public redacted document 212A. For example, a user is denied access to customer facing redacted document 212B because $F_S$=2 (customer facing viewing location 208B=2), and $D_S$=1 (public location), and $F_S > D_S$.

As another example, if remote device 102A is in a public viewing location 208A (e.g., in a public mall), remote device 102A can calculate $D_S$ to require a document with a public redaction level 210A to ensure that all non-public information is redacted (e.g., to prevent unintentional dissemination of confidential information if the remote device 102A is lost or stolen, or if a third party is also viewing a display of the remote device 102A). The remote device 102A can determine whether container 300 includes a document with a sufficient public redaction level 210A. In some embodiments, the remote device 102A can separately analyze each document in the container 300 based on the security factor $F_S$ of the document. For example, original document 212D can be associated with a security factor $F_S$ that requires an internal redaction level 204. Because internal reaction level 204 ($F_S$) is greater than the requested public redaction level 210A ($D_S$) (e.g., the internal redaction level 204 requires an internal location 208D, which is more secure than public viewing location 208A), the remote device 102A denies access to original document 212D. Because the remote device 102A can determine the same result for internal public redacted document 212C and customer facing redacted document 212B, the remote device 102A can deny access to both documents. For public redacted document 212A, the remote device 102A can determine the public redaction level 210A is equal to that required for the public viewing location 208A of the remote device 102A, and can therefore request any necessary decryption information to view the document from the server 108.

In some embodiments, the remote device 102A searches for a document in container 300 that meets $D_S$. For example, if remote device 102A is in a public viewing location 208A ($D_S$), the remote device 102A selects public redacted document 212A for viewing because it was redacted according to public redaction level 210A, and is therefore appropriate for viewing at public viewing location 208A.

In some embodiments, the server 108 can receive a request for a document and the corresponding location of the remote device 102A, and can determine whether the remote device 102A should be transmitted the additional encryption information based on the device's location. For example, similar to Algorithm 1, server 108 can a request to view an original document for $D_S$ (e.g., a public viewing location) from the remote device 102A. The server 108 can determine whether remote device 102A can view a document based on $F_S$ (e.g., public redacted document 212A has an $F_S$ of public viewing location 208A, which is equivalent to the public viewing location $D_S$). The server 108 can transmit decryption information for public redacted document 212A in container 300 (e.g., redacted document 208A) to the remote device 102A.

In some embodiments, remote device 102A can be given access to multiple documents in a container. For example, if there are multiple documents where $F_S = D_S$, the remote device 102A can request additional encryption information for all documents where $F_S = D_S$ (e.g., or server 108 can determine remote device 102A should be transmitted additional encryption information for all of such documents).

In some embodiments, the remote device 102A may not have the redacted document for which it requested additional encryption information. Referring to FIG. 3, for example, remote device 102A may request additional encryption information for a placeholder document included in the body 304. In some embodiments, the remote device 102A can request the redacted document in addition to the additional encryption information. The remote device 102A can determine the redacted document to request based on document reference information in the placeholder document (e.g., a unique identifier or pointer). In some embodiments, the server 108 can determine that the additional encryption information is associated with a redacted document that was not transmitted to the remote device 102A (e.g., instead, the container 300 included a placeholder document). The server 108 can transmit the redacted document to the remote device 102A (and/or can verify the request for the document).

At step 416, the server 108 can transmit the additional encryption information to the remote device 102A, so the remote device 102A can decrypt and view the redacted document. For example, the additional encryption information can be a public key. The remote device 102A can use the private key associated with the redacted document (e.g., from the encryption information 306 in the header 302) and the received public key to decrypt the redacted document.

FIG. 5, with further reference to FIG. 1, is an exemplary diagram of a computerized method 500 for secure redacted document access. The method 500, however, is exemplary only and not limiting. The method 500 can be altered, e.g., by having stages added, altered, removed, or rearranged.

At step 502, the remote device 102A executes (e.g. opens) a viewing application for viewing documents. The viewing application can be, for example, Microsoft® Word, Adobe® Acrobat, and/or other document processing applications. The viewing application can include both standard computer code and custom computer code (e.g., computer code that is compiled into an executable form). The standard code is the usual code used to execute the viewing application, which is not configured to process the container 300 data type (e.g., the standard executable code that is downloaded to install Adobe® Acrobat on a device). The custom code is code that can be added to the standard viewing application code that is configured to allow the viewing application to process a container 300 data type. For example, the additional code can be a separate executable than the standard viewing application executable, and/or can be incorporated into the original code and recompiled into a single executable. In some embodiments, the custom code is a secure container access layer configured to intercept and process calls from viewing applications to the containers (e.g., to either allow the action, modify the action, and/or prevent the action).

In some embodiments, the remote device 102A attempts to open the container 300 using an application that is not configured to process the container 300 (e.g., the application does not include custom code to process the container 300, which is not a file type that the standard code for the application can process). For example, if the container 300 is stored on a cloud storage device (e.g., Dropbox™), remote devices that are not configured to process the container 300 may attempt to access the container 300. The container 300 can be configured to display a placeholder document if opened by an application that can not process the container 300. In some embodiments, the user can be unaware that it is trying to open a container (e.g., the container 300 can be disguised as an ordinary PDF file to the user).

For example, if the remote device 102A uses a standard version of Adobe® Acrobat (that does not include custom code configured to open the container 300), Acrobat can display a placeholder document in place of any redacted documents in the container 300. The placeholder document can be, for example, a single page document with a message (e.g., which explains the application is not authorized to open the container 300, includes instructions on how to download a version of the application that includes the custom code, etc.). For example, a standard version of Adobe® Acrobat can not execute the policy safeguards put in place by the container 300 data type (e.g., and therefore may not prevent a user from saving a redacted document in a separate location from the container 300). To avoid a loss of security and policy control, the container 300 can be configured to cause the standard version of Acrobat to only open a harmless placeholder page. The placeholder page can be, for example, a placeholder document in the container (e.g., placeholder document 312, or an additional document stored in the container 300, not shown).

In some embodiments, the remote device 102A can download the viewing application (with both standard code and custom code) from a custom application site. For example, application management utilities can be used to provide a bridge between commercial applications and the container 300 data type. For example, RAPsphere's mobile application management solution (acquired by AppSense) can be used to add a policy layer to commercial applications to process the container 300 data type. For example, commercial applications can be modified to include the custom code (e.g., a policy layer), and can be downloaded by remote device 102A (e.g., from an online application store provided by the company deploying the containers 300).

At step 504, the remote device 102A can receives a container 300 of the container data type from the server 108. The container 300 can include a set of redacted documents (e.g., redacted documents 308, 310, 312, and 314 or placeholder documents) for an original document. Each redacted document can be redacted according to a level of redaction (e.g., redaction level 204) that is appropriate for a viewing location (e.g., associated viewing locations 202). The container 300 can include a header 302 that stores encryption information 306 for each redacted document.

At step 506, the remote device 102A can intercept an application call from the viewing application to perform an action to the container 300. For example, the application call can be an application call to open the container 300, to close an open document from the container 300 (e.g., an open decrypted document), to save a document from the container 300 (or the container 300 itself), to delete a document from the container 300 (or the container 300 itself), and/or other application calls.

At step 508, the remote device 102A can select a custom action from a set of custom actions to use to process the container. The remote device 102A can select the custom action based on the intercepted application call, the location 106A of the remote device 102A, and/or other data. The remote device 102A can store the set of custom actions for the container 300 data type (e.g., separate from the custom code, and/or in the custom code for the viewing application). For example, a custom action can be a custom open action configured to open a redacted document (e.g., redacted document 308) from the set of documents in the container 300 based on the location 106A of the computing device 102A. As another example, the custom action can be a custom close action configured to close a document (e.g., an open, decrypted redacted document from the container 300) and/or to perform additional actions, such as deleting any stored copies of the document. As another example, the custom action can be a custom save action configured to protect a document (e.g., by preventing a save of the document).

At step 510, the remote device 102A can process the container 300 based on the intercepted application call. The remote device 102A can execute the custom action instead of the application call, can execute both actions, and/or can prevent the application call from being executed. For example, the remote device 102A can intercept an application call to open the container (e.g., from the viewing device) and instead execute a custom open action. The remote device 102A can determine the location 106A of the remote device 102A. The remote device 102A can select a redacted document (e.g., redacted document 308) from the set of redacted documents that was redacted according to a redaction level (e.g., redaction level 204) for a viewing location (e.g., viewing location 202) that is equal to the location 106A of the computing device. For example, the remote device 102A can execute Algorithm 1 to select the redacted document. The remote device 102A can open the redacted document using the viewing application.

In some embodiments, the remote device 102A can use additional encryption information to open the encrypted redacted document (e.g., the remote device 102A has a private key for the redacted document, but needs the corresponding public key to decrypt the redacted document). The remote device 102A can transmit a request to view the redacted document to the server 108 (e.g., a request to receive additional encryption information, like step 414 of method 400). The remote device 102A can receive additional encryption information (e.g., the public key) for the redacted document. The remote device 102A can decrypt the redacted document, e.g., by using the partial decryption information 306 for the redacted document and the additional encryption information from the server 108. The remote device 102A can display the decrypted redacted document using the viewing application.

As another example, the remote device 102A can intercept a call to close a document from the viewing application (e.g., a call to close a decrypted redacted document that is being processed by the viewing application) and execute a custom close action that both closes the document and executes additional actions. For example, the remote device 102A can close the decrypted redacted document so that the viewing application no longer displays the redacted document. The remote device 102A can delete the decrypted redacted document from the remote device 102A (e.g., to prevent accidental access to the decrypted redacted document).

As another example, the custom action can be a custom save action. For example, the remote device 102A can intercept an application call to save a decrypted redacted document, and determines whether the remote device 102A is allowed to save the document. The remote device 102A can determine whether the remote device 102A can save the decrypted redacted document based on (a) the remote device 102A (e.g., the remote device 102A is a personal computer, and therefore has rights to save the document), (b) the location 106A of the remote device 102A (e.g., the remote device 102A is located at a company's premises, and therefore has rights to save the document), (c) the document (e.g., the document does not contain any confidential information), and/or the like. If allowed, the remote device 102A can save the document (e.g., on memory associated with the remote device 102A). If not allowed, the custom code of the viewing application prevents the decrypted redacted document from being saved on the remote device 102A.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

While the foregoing refers to the "invention," this disclosure may include more than one invention.

What is claimed is:

1. A computerized method for accessing a document, comprising:
   generating, by a computing device, a container comprising:
      a set of redacted documents corresponding to an original document, each redacted document having a level of redaction corresponding to a viewing location;
      a placeholder document for each redacted document in the set of redacted documents; and
      a header comprising encryption information for each redacted document in the set of redacted documents;
   receiving, by the computing device, a request to view the original document from a requesting device;
   transmitting, by the computing device, the container to the requesting device;
   receiving, by the computing device, a request for additional encryption information for a redacted document from the set of redacted documents from the requesting device, wherein the redacted document comprises a level of redaction for a viewing location that is equal to a location of the requesting device;
   transmitting, by the computing device, the additional encryption information to the requesting device;
   determining at least one of (a) the requesting device attempts to view the particular redacted document, which comprises a level of redaction for a viewing location that is less than that required for the location of the viewing device, or (b) the user device is not configured to read the container, or any combination thereof; and
   viewing the placeholder document instead of a particular redacted document.

2. The computerized method of claim 1, wherein transmitting the container comprises transmitting a subset of redacted documents from the set of redacted documents to the requesting device, wherein the subset of documents are viewed more often than the remaining redacted documents in the set of redacted documents.

3. The computerized method of claim 2, further comprising:
   determining the additional encryption information is associated with a redacted document that was not transmitted to the requesting device; and
   transmitting the redacted document to the requesting device.

4. The computerized method of claim 1, wherein generating the container further comprises:
   generating encryption information for each redacted document in the set of redacted documents, the encryption information comprising partial encryption information and additional encryption information;
   encrypting each redacted document in the set of redacted documents based on its associated encryption information; and
   adding the partial encryption information for each redacted document in the set of redacted documents to the header.

5. The computerized method of claim 1, further comprising:
   generating second encryption information for the container for the requesting device, the second encryption information comprising a public key and a private key;
   encrypting the header of the container based on the second encryption information;
   determining the requesting device is allowed to access the container; and transmitting the second encryption information to the requesting device with the container for a first session, wherein the requesting device does not store the public key.

6. The computerized method of claim 5, further comprising:
receiving a second request to view the original document from the requesting device;
determining the requesting device is allowed to access the container for a second session; and
transmitting the public key to the requesting device for the second session.

7. An apparatus for accessing a document, the apparatus comprising:
a processor; and
a memory coupled to the processor and including computer readable instructions that, when executed by the processor, are configured to cause the processor to:
generate a container comprising:
a set of redacted documents corresponding to an original document, each redacted document having a level of redaction corresponding to a viewing location;
a placeholder document for each redacted document in the set of redacted documents; and
a header comprising encryption information for each redacted document in the set of redacted documents;
receive a request to view the original document from a requesting device;
transmit the container to the requesting device;
receive a request for additional encryption information for a redacted document from the set of redacted documents from the requesting device, wherein the redacted document comprises a level of redaction for a viewing location that is equal to a location of the requesting device;
transmit the additional encryption information to the requesting device;
determine at least one of (a) the requesting device attempts to view the particular redacted document, which comprises a level of redaction for a viewing location that is less than that required for the location of the viewing device, or (b) if the user device is not configured to read the container, or any combination thereof; and
view a placeholder document instead of a particular redacted document.

8. The apparatus of claim 7, wherein transmitting the container comprises transmitting a subset of redacted documents from the set of redacted documents to the requesting device, wherein the subset of documents are viewed more often than the remaining redacted documents in the set of redacted documents.

9. The apparatus of claim 8, wherein the computer readable instructions are further configured to:
determine the additional encryption information is associated with a redacted document that was not transmitted to the requesting device; and
transmit the redacted document to the requesting device.

10. The apparatus of claim 7, wherein generating the container further comprises:
generating encryption information for each redacted document in the set of redacted documents, the encryption information comprising partial encryption information and additional encryption information;
encrypting each redacted document in the set of redacted documents based on its associated encryption information; and
adding the partial encryption information for each redacted document in the set of redacted documents to the header.

11. The apparatus of claim 7, wherein the computer readable instructions are further configured to:
generate second encryption information for the container for the requesting device, the second encryption information comprising a public key and a private key;
encrypt the header of the container based on the second encryption information;
determine the requesting device is allowed to access the container; and
transmit the second encryption information to the requesting device with the container for a first session, wherein the requesting device does not store the public key.

12. The apparatus of claim 11, wherein the computer readable instructions are further configured to:
receive a second request to view the original document from the requesting device;
determine the requesting device is allowed to access the container for a second session; and
transmit the public key to the requesting device for the second session.

13. A computer program product, tangibly embodied in a non-transitory computer readable medium, the computer program product including instructions being configured to cause a data processing apparatus to:
generate a container comprising:
a set of redacted documents corresponding to an original document, each redacted document having a level of redaction corresponding to a viewing location;
a placeholder document for each redacted document in the set of redacted documents; and
a header comprising encryption information for each redacted document in the set of redacted documents;
receive a request to view the original document from a requesting device;
transmit the container to the requesting device;
receive a request for additional encryption information for a redacted document from the set of redacted documents from the requesting device, wherein the redacted document comprises a level of redaction for a viewing location that is equal to a location of the requesting device;
transmit the additional encryption information to the requesting device;
determine at least one of (a) the requesting device attempts to view the particular redacted document, which comprises a level of redaction for a viewing location that is less than that required for the location of the viewing device, or (b) if the user device is not configured to read the container, or any combination thereof; and
view a placeholder document instead of a particular redacted document.

* * * * *